(12) United States Patent
Chen

(10) Patent No.: US 6,632,991 B2
(45) Date of Patent: Oct. 14, 2003

(54) SCALE INDICATOR FOR A KEYBOARD INSTRUMENT

(76) Inventor: Wei-Chih Chen, No. 135, Ssu-Chuan Rd., Taichung (TW)

(*) Notice: Subject to any disclaimer, the term of this patent is extended or adjusted under 35 U.S.C. 154(b) by 80 days.

(21) Appl. No.: 10/039,376

(22) Filed: Jan. 2, 2002

(65) Prior Publication Data

US 2003/0121399 A1 Jul. 3, 2003

(51) Int. Cl.[7] .............................................. G09B 15/02
(52) U.S. Cl. ...................................... 84/471 R; 84/478
(58) Field of Search ............................ 84/477 R, 478, 84/479 R, 479 A, 485 A

(56) References Cited

U.S. PATENT DOCUMENTS

| | | | | |
|---|---|---|---|---|
| 6,133,518 A | * | 10/2000 | Kamimura et al. | 84/423 R |
| 6,225,545 B1 | * | 5/2001 | Suzuki et al. | 84/477 R |
| 6,337,434 B2 | * | 1/2002 | Oren-Chazon | 84/478 |
| 6,348,649 B1 | * | 2/2002 | Chen et al. | 84/477 R |
| 6,380,472 B1 | * | 4/2002 | Sugiyama et al. | 84/478 |

* cited by examiner

*Primary Examiner*—Kimberly Lockett
(74) *Attorney, Agent, or Firm*—Jackson Walker L.L.P.

(57) ABSTRACT

A scale indicator for a keyboard of a keyboard instrument has a stand, a belt and an indicating element. The belt is moveably mounted on the stand. A key selecting area is mounted on the belt and has multiple key-selecting blocks each illuminating at least one symbol of a musical key. A note illuminating area is mounted on the belt and has multiple note-illuminating blocks. Each note-illuminating block shows a symbol of a note and corresponds to one of the keys of the keyboard instrument. The indicating element corresponds to one of the key-selecting blocks to select the music key shown on the key-selecting block. Accordingly, the user can strike the keys on the keyboard according to the note symbols on the note-illuminating blocks in the selected music key.

17 Claims, 6 Drawing Sheets

SCALE INDICATOR FOR A KEYBOARD INSTRUMENT

BACKGROUND OF THE INVENTION

1. Field of the Invention

The present invention relates to a scale indicator, and more particularly to a scale indicator for a keyboard instrument to show the instrument player which key corresponds to which note.

2. Description of Related Art

A keyboard instrument like a piano has a keyboard with multiple keys for a user to strike the keys to play music. In general, the keys of the keyboard instrument include multiple white keys and black keys. Each key is associated with one note or tone on a scale like Do, Re, Mi and so on. However, each key of the keyboard does not correspond to the same note or tone in different musical keys. For example, when the musical key has changed from C major to D flat major or F sharp major, the key on the keyboard corresponding to the note or tone Do is also changed. The change of the positions of the notes is very complex for a new player. Consequently, the conventional keyboard without any indicating device is difficult for a new player to play in different musical keys.

To overcome the shortcomings, the present invention tends to provide a scale indicator to mitigate or obviate the aforementioned problems.

SUMMARY OF THE INVENTION

The main objective of the invention is to provide a scale indicator for a keyboard instrument to indicate to the player which key of the keyboard corresponds to which scale. The scale indicator has a stand, a belt and an indicating element. The belt is moveably mounted on the stand. A key selecting area is mounted on the belt and has multiple key-selecting blocks each illuminating at least one symbol of a musical key. A note illuminating area is mounted on the belt and has multiple note-illuminating blocks arranged in a row. Each note-illuminating block shows a symbol of a note and corresponds to one of the keys of the keyboard instrument. The indicating element corresponds to one of the key-selecting blocks to select the music key shown on the key-selecting block. Consequently, the note-illuminating blocks will show the notes for the keys on the keyboard after the player moves the belt to one of the key-selecting blocks aligning with the indicating element to select a desired musical key. This can show the player which keys on the keyboard correspond to which note. Thus, learning to play the keyboard instrument with the present invention becomes easier.

Other objects, advantages and novel features of the invention will become more apparent from the following detailed description when taken in conjunction with the accompanying drawings.

DETAILED DESCRIPTION OF PREFERRED EMBODIMENT

Figure 1:
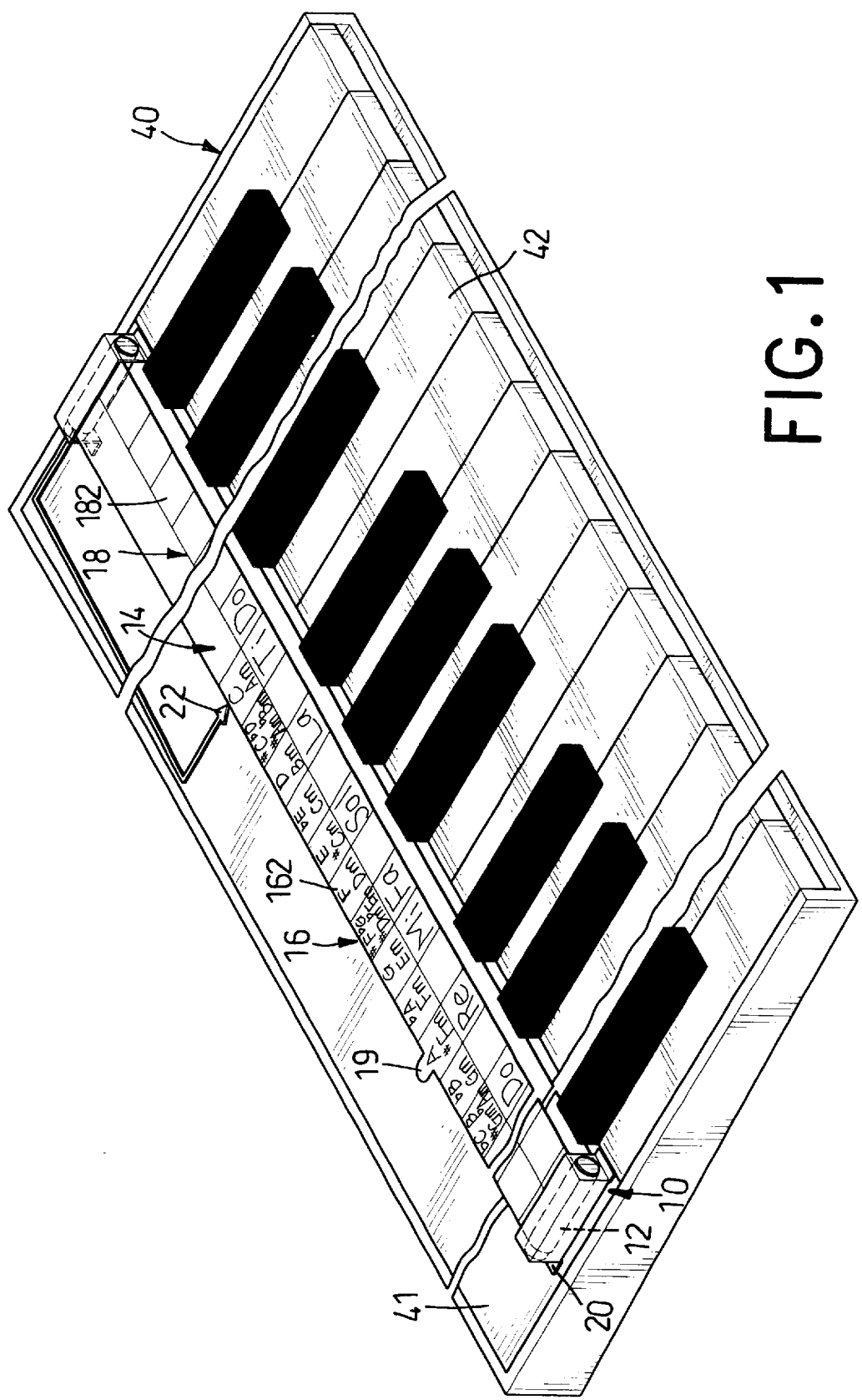
FIG. 1 is a perspective view of a first embodiment of a scale indicator in accordance with the present invention.
Figure 4:
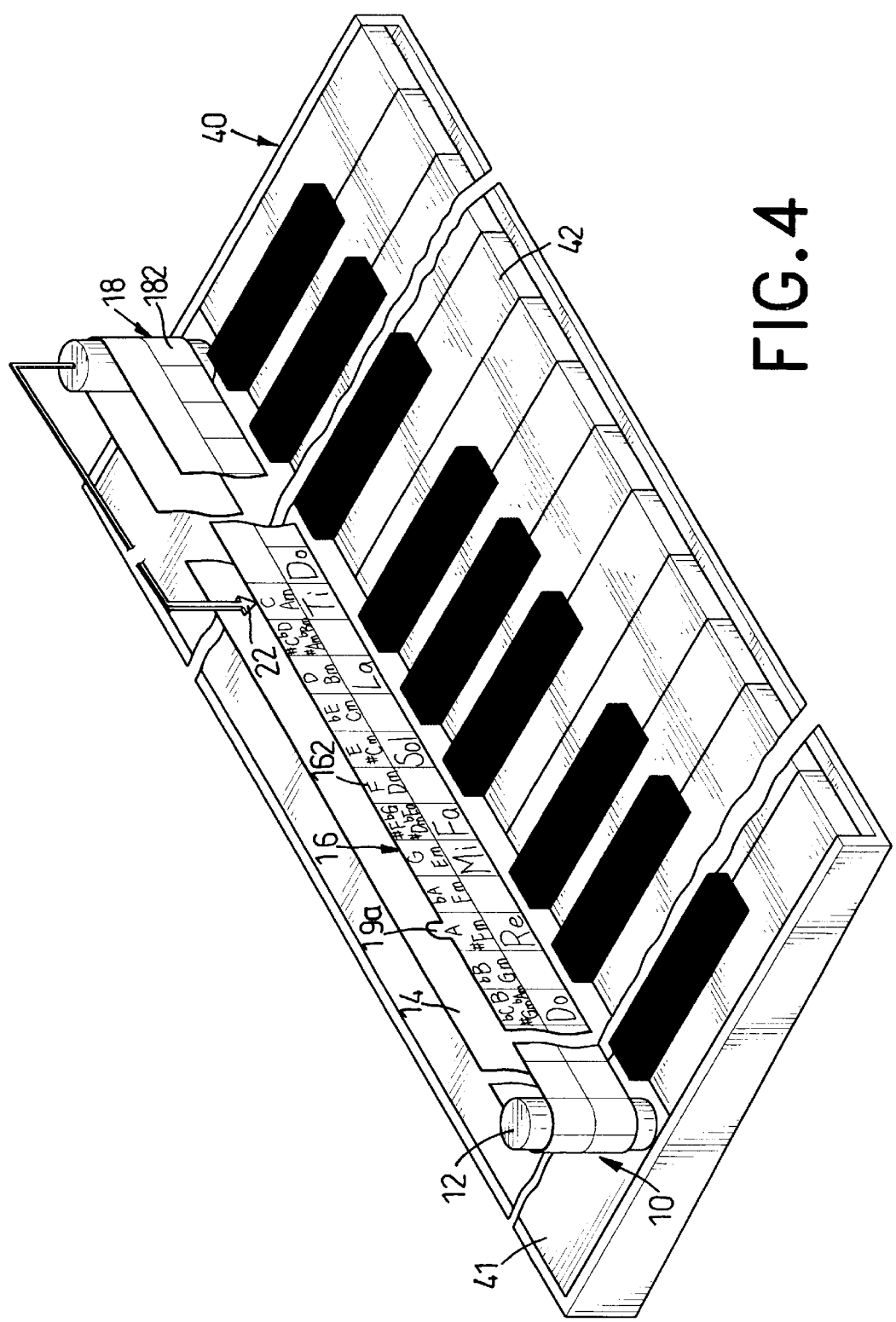
FIG. 4 is a perspective view of a second embodiment of a scale indicator in accordance with the present invention.

With reference to FIG. 1, a scale indicator (10) for a keyboard instrument in accordance with the present invention comprises a stand, a belt (14) and an indicating element (22). The belt (14) is moveably mounted on the stand. The stand can be formed as two shafts (12) as shown in FIGS. 1 and 4. The belt (14) is reeved around the two shafts (12) and is able to move between the two shafts (12). Two brackets (20) are mounted on a keybed (41) of the keyboard (40). Each shaft (12) is attached one of the brackets (20) so that the scale indicator (10) is horizontally mounted on the keybed (41).

A key selecting area (16) is mounted on the belt (14) and has multiple key-selecting blocks (162) arranged in a row. Each key selecting block (162) illuminates at least one symbol of a musical key. A note illuminating area (18) is mounted on the belt (14) and below the key selecting area (16). The note illuminating area (18) has multiple note-illuminating blocks (182) arranged in a row. Each note-illuminating block (182) shows a symbol of a musical note, and each note-illuminating block (182) corresponds to one of the keys (42) of the keyboard instrument.

The indicating element (22) corresponds to one of the key-selecting blocks (162) to select the music key shown on the key-selecting block (162). In practice, the indicating element (22) is a pointer mounted on one of the shafts (12) and extending to face one of the note-illuminating blocks (162). In another embodiment, the indication element (22) is a pointer mounted on the keybed (41) of the keyboard (40) and facing one of the note-illuminating blocks (162).

Figure 2:
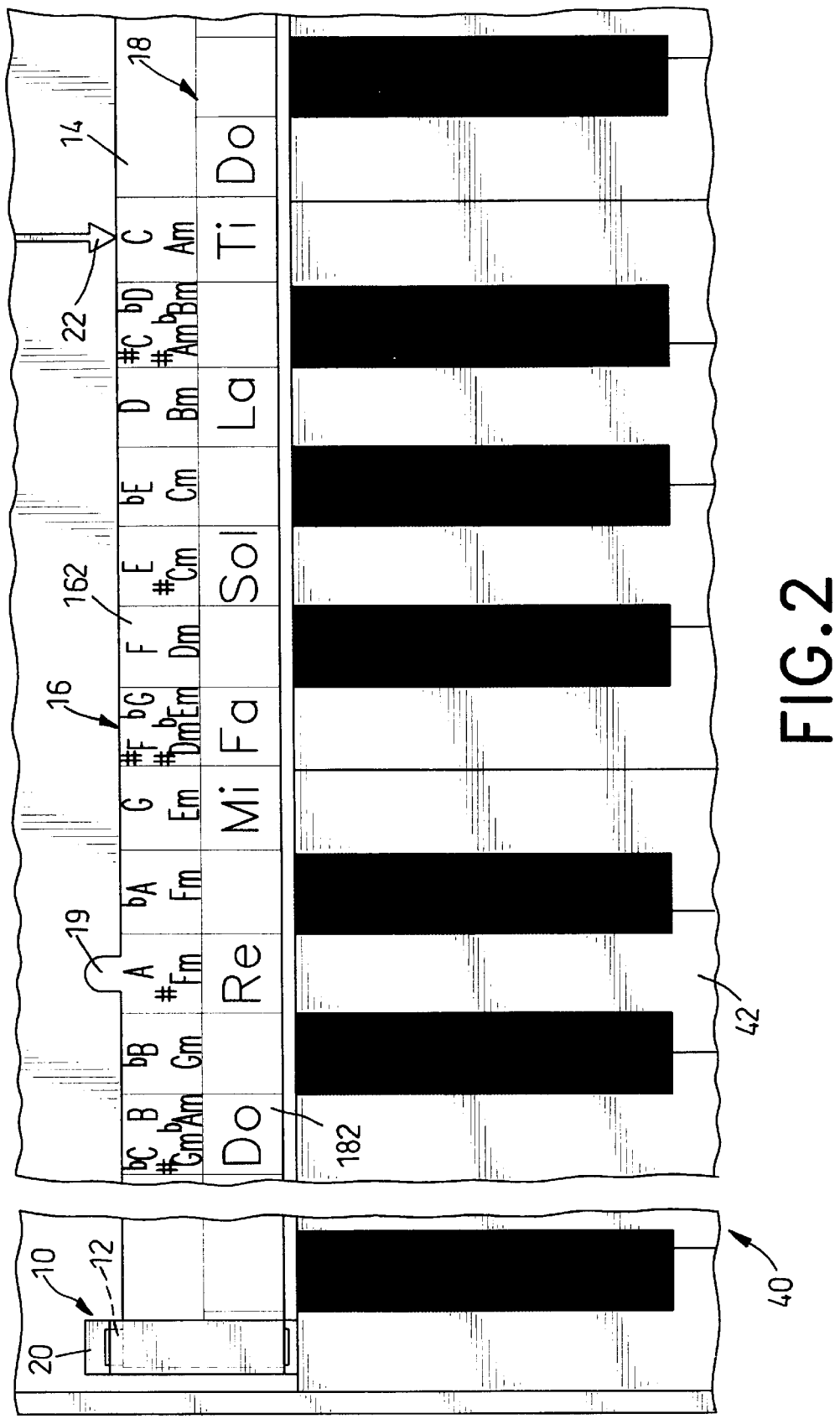
FIG. 2 is a partially top plan view of the scale indicator in FIG. 1 showing the notes in the C major key or the A minor key.

With reference to FIGS. 1 and 2, when the belt (14) is moved to a position where the pointer (22) aligns with one of the key-selecting blocks (162) illuminating desired musical keys, the notes of the keys (42) will be shown on the corresponding note-illuminating blocks (182) on the belt (14). For example, if a player wants to play the C major key, he or she moves the belt (14) to a position where the key-selecting block (162) illuminating a symbol of the C major key aligns with the pointer (22). The notes of the keys (42) of the keyboard (40) will be shown according to the note symbols on the note-illuminating blocks (182). Consequently, the player can strike the keys (42) according to the indication of the scale indicator (10) to play notes in the C major key.

Figure 3:
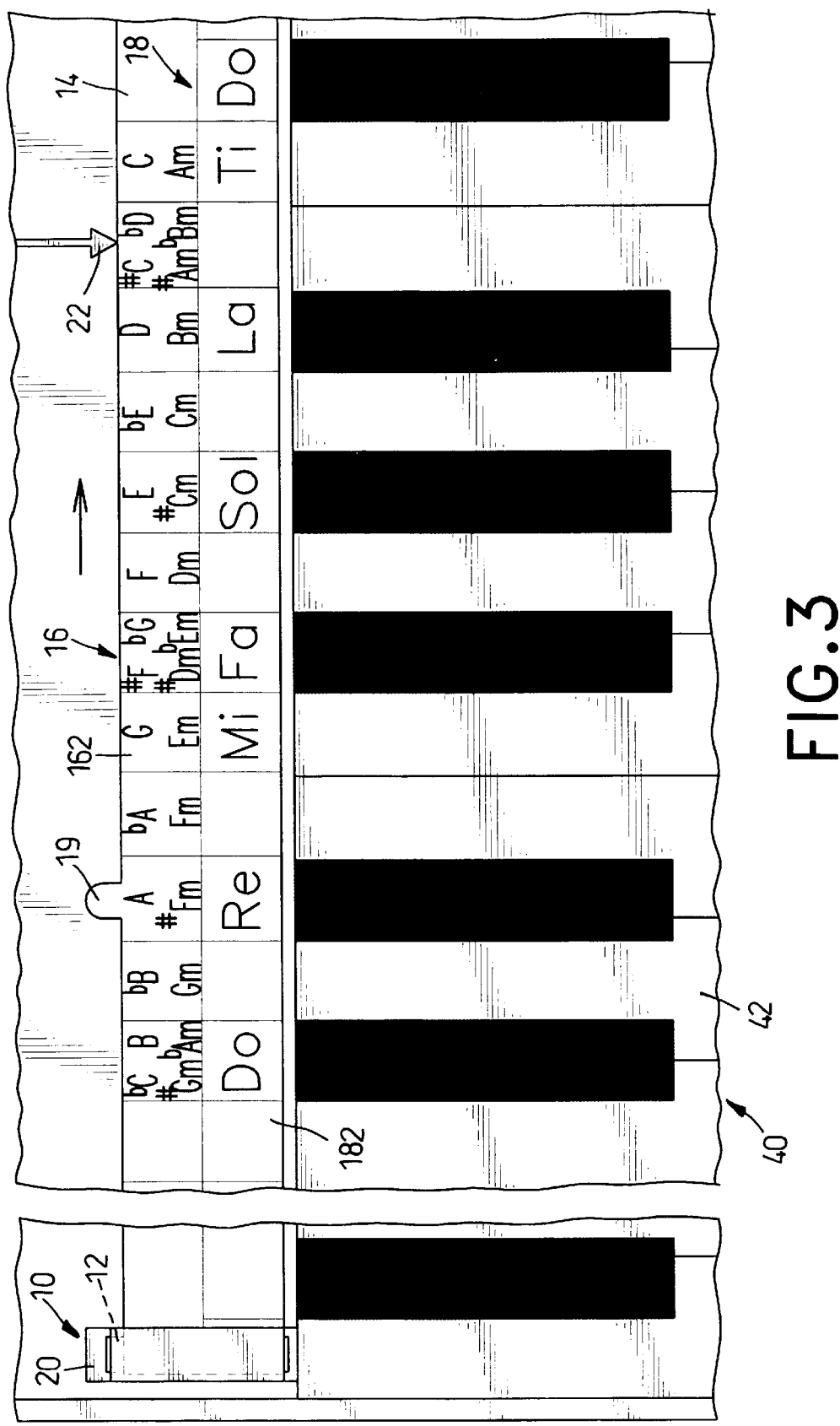
FIG. 3 is a partially top plan view of the scale indicator in FIG. 1 showing the notes in the C sharp key, the D flat major key, the A sharp minor key or the B flat minor key.

With reference to FIG. 3, when the belt (14) is moved to a position where the key-selecting block (162) illuminating a symbol of the D flat major key or the A sharp minor key aligns with the pointer (22), the note illuminating area (18) will simultaneously move with the belt (14). The note-illuminating blocks (182) of the note illuminating area (18) will be moved to face different keys (42) on the keyboard (40). The player can strike the keys (42) according to the new indication of the scale indicator (10) to play notes in the D flat major key or the A sharp minor key. Accordingly, a new player has an ability to correctly play music in different musical keys with the keyboard (40). To play the keyboard instrument while using the present invention becomes easier over the prior art.

With reference to FIG. 4, in a second embodiment of the scale indicator (10), the two shafts (12) are respectively inserted into two holes defined in the keybed (41) so as to vertically mount the scale indicator (10) onto the keyboard (40). In addition, a tab (19a) is formed on the belt (14). Consequently, the user can easily move the belt (14) relative to the two shafts (12) by using the tab (19a).

Figure 5:
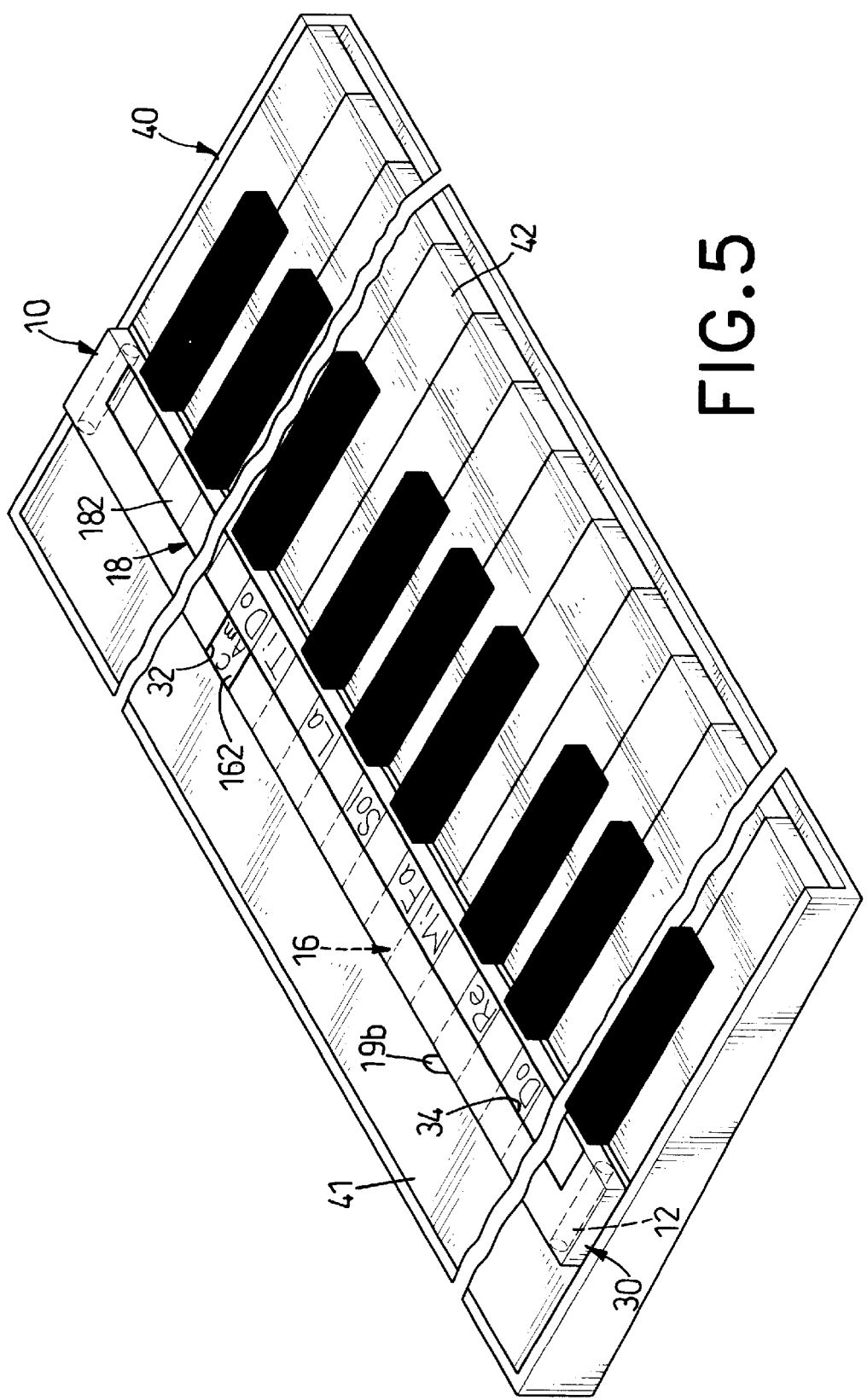
FIG. 5 is a perspective view of a third embodiment of a scale indicator in accordance with the present invention.

With reference to FIG. 5, in a third embodiment of the scale indicator (10), the scale indicator (10) further comprises a case (30). The two shafts (12) and the belt (14) are contained in the case (30). A key window (32) is defined in the case (30) and aligns with one of the key-selecting blocks (162) to serve as an indicating element. A note window (34) is defined in the case (30) and aligns with the note illuminating area (18) to expose the note-illuminating blocks (182) from the case (30). A tab (19b) is formed on the belt (14) and extends outward from the case (30).

Accordingly, the user can move the belt (14) relative to the case (30) through the tab (19b). The key symbol illuminated on the key-selecting block (162) aligning with and exposed from the key window (32) is the selected musical key. The player can strike the keys (42) in the selected key according to the indication of the note symbols on the exposed note-illuminating blocks (182) from the note window (34) in the case (30).

Figure 6:
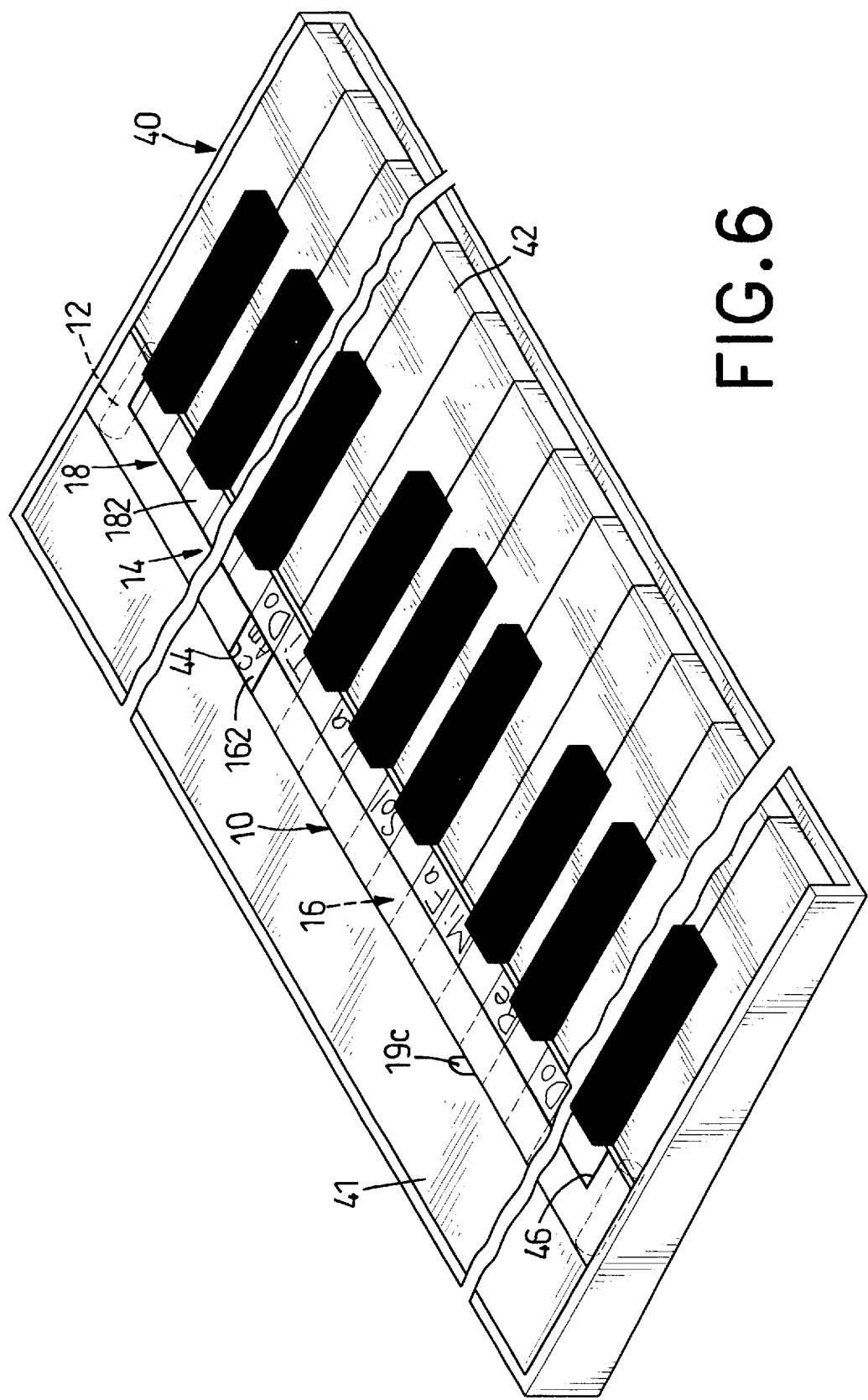
FIG. 6 is a perspective view of a fourth embodiment of a scale indicator in accordance with the present invention.

With reference to FIG. 6, in a fourth embodiment of the scale indicator (10), the shafts (12) and the belt (14) are contained in the keybed (41) of the keyboard (40). A key window (44) is defined in the keybed (41) and aligns with one of the key-selecting blocks (162) to serve as an indicating element. A note window (46) is defined in the keybed (41) and aligns with the note illuminating area (18) to expose the note-illuminating blocks (182) from the keybed (41). A tab (19c) is formed and extends outward from the keybed (41).

Furthermore, the stand of the scale indicator (10) can be the case (30) as shown in FIG. 5 or the keybed (41) of the keyboard (40) as shown in FIG. 6. In such an embodiment, two slots (not shown) are defined in the case (30) or the keybed (41) and parallel to each other. The belt (14) extends through the slots and surrounds the case (30) or the keybed (41) to be moveably mounted on the case (30) or the keybed (41).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A scale indicator for a keyboard instrument having a keyboard with multiple white keys, black keys and a keybed for receiving the white keys and black keys, the scale indicator comprising:

a stand;

a belt moveably mounted on the stand and having:

a key selecting area mounted on the belt and having multiple key-selecting blocks each illuminating at least one symbol of a musical key; and a note illuminating area mounted on the belt and having multiple note-illuminating blocks arranged in a row, each note-illuminating block showing a symbol of a note and corresponding to one of the keys of the keyboard instrument; and an indicating element corresponding to one of the key-selecting blocks to select the music key shown on the key-selecting block, thereby the note-illuminating blocks will indicate the notes for the keys on the keyboard according to the selected music key.

2. The scale indicator as claimed in claim 1, wherein the stand comprises two shafts formed parallel to each other; and the belt is reeved around the two shafts to be moveably mounted between the two shafts.

3. The scale indicator as claimed in claim 2 further comprising two brackets, each bracket attached to one of the shafts on the bracket so that the scale indicator is horizontally mounted on the keybed of the keyboard.

4. The scale indicator as claimed in claim 3, wherein the indicating element is a pointer adapted to be mounted on the keybed of the keyboard and aligning with one of the key-selecting blocks.

5. The scale indicator as claimed in claim 3, wherein the indicating element is a pointer mounted on one of the shafts and extending to align with one of the key-selecting blocks.

6. The scale indicator as claimed in claim 2, wherein the two shafts are adapted to be inserted into two holes in the keybed so as to vertically mount the scale indicator onto the keyboard.

7. The scale indicator as claimed in claim 6, wherein the indicating element is a pointer mounted on one of the shafts and extending to align with one of the key-selecting blocks.

8. The scale indicator as claimed in claim 2 further comprising a tab formed on the belt adapted for helping a user to easily move the belt relative to the two shafts.

9. The scale indicator as claimed in claim 2 further comprising a case containing the two shafts and the belt, wherein a key window is defined in the case and aligns with one of the key-selecting blocks to serve as an indicating element; and a note window is defined in the case and aligns with the note illuminating area to expose the note-illuminating blocks from the case.

10. The scale indicator as claimed in claim 9 further comprising a tab formed on the belt and extending outward from the case whereby a user can move the belt relative to the two shafts.

11. The scale indicator as claimed in claim 1 further comprising a tab formed on the belt adapted for helping a user to easily move the belt relative to the stand.

12. The scale indicator as claimed in claim 2, wherein the shafts and the belt are adapted to be contained in the keybed of the keyboard;

a key window is defined in the keybed and aligns with one of the key-selecting blocks to serve as an indicating element; and a note window is defined in the keybed and aligns with the note illuminating area to expose the note-illuminating blocks from the keybed.

13. The scale indicator as claimed in claim 12 further comprising a tab formed on the belt and extending outward from the keybed adapted for helping a user to easily move the belt relative to the two shafts.

14. The scale indicator as claimed in claim 2, wherein the stand is the keybed of the keyboard;

two slots are defined in the keybed and formed parallel to each other; and the belt extends through the slots and surrounds the keybed to be moveably mounted on the keybed.

15. The scale indicator as claimed in claim 14 further comprising a tab formed on the belt whereby a user can move the belt relative to the two shafts.

16. The scale indicator as claimed in claim 2, wherein the stand is a case;

two slots are defined in the case and parallel to each other; and the belt extends through the slots and surrounds the case to moveably mounted on the case.

17. The scale indicator as claimed in claim 16 further comprising a tab formed on the belt and adapted for helping a user to easily move the belt relative to the two shafts.

* * * * *